United States Patent Office 2,703,751
Patented Mar. 8, 1955

2,703,751

HERBICIDAL COMPOSITIONS

Dexter B. Sharp, Vandalia, Ohio, assignor to Monsanto Chemical Company, St. Louis, Mo., a corporation of Delaware No Drawing. Application March 23, 1953,
Serial No. 344,193

13 Claims. (Cl. 71—2.3)

The present invention provides new and valuable compositions possessing high herbicidal efficacy and methods of destroying or preventing plant growth in which such compositions are used.

I have found that improved, very efficient herbicidal compositions are obtained when there are prepared oil-in-water emulsions of a phenylhydrazone of a ketone having the formula

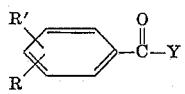

in which R and R' are selected from the class consisting of hydrogen, chlorine, alkyl radicals of from 1 to 3 carbon atoms and alkoxy radicals of from 1 to 3 carbon atoms, and Y is an alkyl radical of from 1 to 3 carbon atoms. Phenylhydrazones useful for the present purpose include phenylhydrazones of acetophenone, 2-, 3- or 4-chloroacetophenone, 2,5- or 3,4-dichloroacetophenone, propiophenone, 2-, 3- or 4-chloropropiopenone, 2,6- or 3,5-dichloropropiophenone, isobutyrophenone, 2-, 3- or 4-chloroisobutyrophenone, ar - dichlorobutyrophenone, 2-, 3- or 4-methylacetophenone, 2-, 3- or 4-ethylacetophenone, 2-, 3- or 4-n-propylacetophenone, ar-dimethylacetophenone, ar-diethylacetophenone, ar-diisopropylacetophenone, 2-, 3- or 4-methylpropiophenone, ar-diethylpropiophenone, ar-diisopropylbutyrophenone, 2-, 3- or 4-methoxyacetophenone, ar-dimethoxyacetophenone, 2-, 3- or 4-n-propoxyacetophenone, 2-, 3- or 4-n-propoxy-3- or 4-n-propoxyacetophenone, 2-, 3- or 4-n-propoxypropiophenone, ar-diethoxybutyrophenone, 2-chloro-3-methylacetophenone, 3 - chloro - 4 - ethoxyacetophenone, 2-ethyl-6-methoxyacetophenone, 3-chloro-2-ethylpropiophenone, 4-n-propoxy-3-propylacetophenone, 4-chloro-3-ethylbutyrophenone, etc.

Some of the present compositions possess general herbicidal activity, i. e., they severely injure or destroy both broad-leafed and narrow-leafed plants when applied theeron. Others are characterized by a high degree of selectivity in that even in very low concentrations, e. g., in a concentration of as low as 0.3 per cent, they cause severe injury to narrow-leafed plants but have no adverse effect on broad-leafed plants at the same or higher concentrations. Such herbicides may thus be employed very advantageously for ridding truck crop fields, e. g., strawberries, beans, etc., of invading grasses.

Herbicidal compositions containing the present phenylhydrazones are readily obtained by first preparing a solution thereof in an organic solvent and then adding the resulting solution to water containing an emulsifying agent to form an emulsion. Because of the very high herbicidal efficiency of the present phenylhydrazones, they are present in the herbicidal composition in only very small concentrations, for example in concentrations of from 0.1 per cent to 2 per cent by weight of the total weight of the emulsion. Emulsifying agents which may be employed are those customarily used in the art for the preparation of oil-in-water emulsions. Examples of emulsifying agents which may be used include alkylbenzenesulfonates, long-chained polyalkylene glycols, long-chained succinates, etc. The emulsions may be used to destroy already existing plant growth by direct application to the undesirable plants, e. g., by spraying, or the emulsions may be employed to prevent plant growth by application to media which normally support plant growth.

The present invention is further illustrated, but not limited, by the following example:

*Example*

Spray testing of the present herbicidal compositions was conducted as follows:

Respective cyclohexanone solutions of phenylhydrazones of the ketones shown below were added to water, the quantity of solution employed being calculated to give emulsions containing 1.0 per cent, 0.3 per cent and 0.1 per cent by weight, respectively, of the compound to be tested, based on the weight of the total emulsion. The quantity of emulsifying agent used was 0.2 per cent by weight, based on the weight of the total emulsion. Said emulsifying agent comprised a mixture of a polyalkyleneglycol derivative and an alkylbenzenesulfonate.

Three-week-old corn and bean plants were sprayed with the respective emulsions, two plants of each variety being employed. The spraying was continued until droplets formed on and/or fell from the foliage and stems of the sprayed plants, up to 15 ml. of the emulsion being applied to each plant. The sprayed plants as well as two untreated "blank" specimens of each plant were then allowed to remain under standard conditions of sunlight and watering for a period of one week. At the end of that time the sprayed plants were compared with the untreated plants in order to determine the extent of injury, if any. The following observations were made:

| Compound Tested at Percent Concentration | Extent* of Injury on— | |
|---|---|---|
| | Corn | Bean |
| Acetophenone phenylhydrazone: | | |
| 1.0% | 4, 4a | 1 |
| 0.3% | 3, 4a | 0 |
| 0.1% | 0 | 0 |
| 4-Chloroacetophenone phenylhydrazone: | | |
| 1.0% | 3 | 0 |
| 0.3% | 1 | 0 |
| 0.1% | 0 | 0 |
| 2,5-Dimethylacetophenone phenylhydrazone: | | |
| 1.0% | 4, 4a | 2 |
| 0.3% | 3 | 1 |
| 0.1% | 2 | 1 |
| n-Propiophenone phenylhydrazone: | | |
| 1.0% | 4, 4a | 1 |
| 0.3% | 3, 4a | 0 |
| 0.1% | 2 | 0 |
| 4-Methoxy-n-propiophenone phenylhydrazone: | | |
| 1.0% | 4, 4a | 1 |
| 0.3% | 1 | 0 |
| 0.1% | 0 | 0 |
| Benzophenone phenylhydrazone: | | |
| 1.0% | 0 | 0 |
| 0.3% | 0 | 0 |
| 0.1% | 0 | 0 |
| α-Acetonapthone phenylhydrazone: | | |
| 1.0% | 1 | 0 |
| 0.3% | 0 | 0 |
| 0.1% | 0 | 0 |
| 4-Nitroacetophenone phenylhydrazone: | | |
| 1.0% | 0 | 0 |
| 0.3% | 0 | 0 |
| 0.1% | 0 | 0 |

*4=plant dead; 4a=leaves dried; 3=severe injury; 2=moderate injury; 1=slight injury; 0=no effect.

The above data show that herbicidal activity of the present phenylhydrazones is not shared by phenylhydrazones of ketones, generally. That the herbicidal effect of the present compounds cannot be attributed to the ketones from which they are derived was shown by submitting acetophenone to the above spray test. At the 1.0 per cent, 0.3 per cent and 0.1 per cent concentration there was evidenced no activity of the acetophenone emulsions against either corn or bean.

While the present phenylhydrazones are most advantageously employed as herbicides by incorporating them into an aqueous emulsion as herein described, they may also be employed in other plant-destroying methods. Thus, they may be incorporated into solid carriers such as clay, talc, pumice and bentonite to give herbicidal compositions which may be applied to living plants or to surfaces which are to be freed from plant growth. The present phenylhydrazones may also be mixed with liquid or solid agricultural pesticides, e. g., insecticides and fungicides. While solutions of the present compounds in organic solvents may be employed for preventing and destroying plant growth, I have found that the emulsions possess an improved tendency to adhere to the treated surfaces and that less of the active ingredients is required to give comparable herbicidal efficiency.

What I claim is:

1. A herbicidal composition comprising an oil-in-water emulsion containing a phytotoxic concentration of a phenylhydrazone having the formula

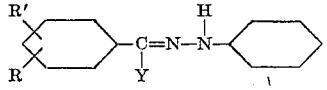

in which R and R' are selected from the class consisting of hydrogen, chlorine, alkyl radicals of 1 to 3 carbon atoms and alkoxy radicals of 1 to 3 carbon atoms and Y is an alkyl radical of from 1 to 3 carbon atoms.

2. A herbicidal composition comprising an oil-in-water emulsion containing a phytotoxic concentration of acetophenone phenylhydrazone.

3. A herbicidal composition comprising an oil-in-water emulsion containing a phytotoxic concentration of 2,5-dimethylacetophenone phenylhydrazone.

4. A herbicidal composition comprising an oil-in-water emulsion containing a phytotoxic concentration of n-propiophenone phenylhydrazone.

5. A herbicidal composition comprising an oil-in-water emulsion containing a phytotoxic concentration of 4-chloroacetophenone phenylhydrazone.

6. A herbicidal composition comprising an oil-in-water emulsion containing a phytotoxic concentration of 4-methoxy-n-propiophenone phenylhydrazone.

7. The method of destroying undesired plants which comprises applying to said plants a phytotoxic quantity of a herbicidal composition, containing as the essential active ingredient, a phenylhydrazone having the formula

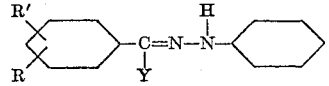

in which R and R' are selected from the class consisting of hydrogen, chlorine, alkyl radicals of 1 to 3 carbon atoms, and alkoxy radicals of 1 to 3 carbon atoms and Y is an alkyl radical of from 1 to 3 carbon atoms.

8. The method of destroying undesired plants which comprises applying to said plants a phytotoxic quantity of an oil-in-water emulsion of a phenylhydrazone having the formula

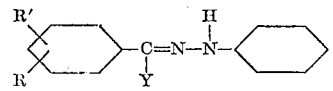

in which R and R' are selected from the class consisting of hydrogen, chlorine, alkyl radicals of 1 to 3 carbon atoms and alkoxy radicals of 1 to 3 carbon atoms and Y is an alkyl radical of from 1 to 3 carbon atoms.

9. The method of destroying undesired plants which comprises applying to said plants a phytotoxic quantity of an oil-in-water emulsion of acetophenone phenylhydrazone.

10. The method of destroying undesired plants which comprises applying to said plants a phytotoxic quantity of an oil-in-water emulsion of 2,5-dimethylacetophenone phenylhydrazone.

11. The method of destroying undesired plants which comprises applying to said plants a phytotoxic quantity of an oil-in-water emulsion of n-propiophenone phenylhydrazone.

12. The method of destroying undesired plants which comprises applying to said plants a phytotoxic quantity of an oil-in-water emulsion of 4-chloroacetophenone phenylhydrazone.

13. The method of destroying undesired plants which comprises applying to said plants a phytotoxic quantity of an oil-in-water emulsion of 4-methoxy-n-propiophenone phenylhydrazone.

No references cited.